United States Patent
Liu et al.

(10) Patent No.: US 9,596,479 B2
(45) Date of Patent: Mar. 14, 2017

(54) METHOD OF PULSE-CODE MODULATION AND PALETTE CODING FOR VIDEO CODING

(71) Applicant: HFI Innovation Inc., Zhubei, Hsinchu County (TW)

(72) Inventors: Shan Liu, San Jose, CA (US); Jungsun Kim, San Jose, CA (US); Tzu-Der Chuang, Zhubei (TW)

(73) Assignee: HFI INNOVATION INC., Zhubei, Hsinchu County (TW)

(*) Notice: Subject to any disclaimer, the term of this patent is extended or adjusted under 35 U.S.C. 154(b) by 0 days.

(21) Appl. No.: 14/821,100

(22) Filed: Aug. 7, 2015

(65) Prior Publication Data

US 2016/0100184 A1    Apr. 7, 2016

Related U.S. Application Data

(60) Provisional application No. 62/060,810, filed on Oct. 7, 2014.

(51) Int. Cl.
  *G06K 9/00* (2006.01)
  *H04N 19/50* (2014.01)
  (Continued)

(52) U.S. Cl.
  CPC ............ *H04N 19/50* (2014.11); *H04N 1/644* (2013.01); *H04N 19/105* (2014.11);
  (Continued)

(58) Field of Classification Search
  CPC .... H04N 1/644; H04N 19/103; H04N 19/105; H04N 19/11; H04N 19/119;
  (Continued)

(56) References Cited

U.S. PATENT DOCUMENTS

| 8,411,942 B2* | 4/2013 | Chen ............... H04N 19/12 382/166 |
| 2014/0301474 A1* | 10/2014 | Guo ............... H04N 19/50 375/240.24 |

(Continued)

FOREIGN PATENT DOCUMENTS

WO    WO 2016/022537    2/2016

OTHER PUBLICATIONS

Joshi, R., et al.; "HEVC Screen Content Coding Draft Text 1;" Joint Collaborative Team on Video Coding (JCT-VC) of ITU-T SG 16 WP 3 and ISO/IEC JTC 1/SC 29/WG 11; Jul. 2014; pp. 1-360.

(Continued)

Primary Examiner — Jose Couso
(74) Attorney, Agent, or Firm — McClure, Qualey & Rodack, LLP

(57) ABSTRACT

Methods for coding a block of video data using palette coding in a video coding are disclosed. According to one embodiment, the palette transpose flag is signaled conditionally depending on the maximum index value or the palette size. If the maximum index value or the palette size is equal to or greater than a threshold size, the palette transpose flag is signaled at an encoder side or parsed at a decoder side. Otherwise, the palette transpose flag is not signaled or parsed. In another embodiment, the last palette and the last palette size are updated by the current palette with the current palette size conditionally. For example, updating the last palette and the last palette size by the current palette with the current palette size is skipped if the current coding unit is coded using a pulse-coded modulation (PCM) mode or the current palette size is zero.

17 Claims, 4 Drawing Sheets

(51) Int. Cl.
| | |
|---|---|
| H04N 19/96 | (2014.01) |
| H04N 19/46 | (2014.01) |
| H04N 1/64 | (2006.01) |
| H04N 19/105 | (2014.01) |
| H04N 19/186 | (2014.01) |
| H04N 19/70 | (2014.01) |
| H04N 19/176 | (2014.01) |
| H04N 19/593 | (2014.01) |
| H04N 19/11 | (2014.01) |
| H04N 19/463 | (2014.01) |
| H04N 19/182 | (2014.01) |
| H04N 19/93 | (2014.01) |
| H04N 19/94 | (2014.01) |

(52) U.S. Cl.
CPC ........... *H04N 19/11* (2014.11); *H04N 19/176* (2014.11); *H04N 19/182* (2014.11); *H04N 19/186* (2014.11); *H04N 19/46* (2014.11); *H04N 19/463* (2014.11); *H04N 19/593* (2014.11); *H04N 19/70* (2014.11); *H04N 19/93* (2014.11); *H04N 19/94* (2014.11); *H04N 19/96* (2014.11)

(58) Field of Classification Search
CPC ...... H04N 19/13; H04N 19/14; H04N 19/157; H04N 19/172; H04N 19/176; H04N 19/182; H04N 19/186; H04N 19/44; H04N 19/46; H04N 19/463; H04N 19/48; H04N 19/50; H04N 19/593; H04N 19/646; H04N 19/70; H04N 19/91; H04N 19/93; H04N 19/94; H04N 19/96; H04N 2201/0089; H04N 19/644; H04N 19/645; G06T 9/00; H03M 7/40
See application file for complete search history.

(56) References Cited

U.S. PATENT DOCUMENTS

| | | | | |
|---|---|---|---|---|
| 2014/0301475 | A1* | 10/2014 | Guo | H04N 19/50 375/240.24 |
| 2015/0016501 | A1* | 1/2015 | Guo | G06T 9/00 375/240.02 |
| 2015/0181223 | A1* | 6/2015 | Gisquet | H04N 19/70 375/240.12 |
| 2015/0256857 | A1* | 9/2015 | Joshi | H04N 19/86 375/240.02 |
| 2015/0264363 | A1* | 9/2015 | Pu | H04N 19/186 375/240.02 |
| 2015/0281703 | A1* | 10/2015 | Zou | H04N 19/186 375/240.24 |
| 2015/0281728 | A1* | 10/2015 | Karczewicz | H04N 19/93 375/240.16 |
| 2015/0341635 | A1* | 11/2015 | Seregin | H04N 19/70 375/240.16 |
| 2015/0341656 | A1* | 11/2015 | Seregin | H04N 19/105 375/240.12 |
| 2015/0341674 | A1* | 11/2015 | Seregin | H04N 19/105 375/240.12 |
| 2016/0057434 | A1* | 2/2016 | Lai | H04N 19/176 382/233 |
| 2016/0100171 | A1* | 4/2016 | Karczewicz | H04N 19/13 375/240.02 |

OTHER PUBLICATIONS

Lai, P.L., et al.; "Description of screen content coding technology proposal by MediaTek;" Joint Collaborative Team on Video Coding (JCT-VC) of ITU-T SG 16 WP 3 and ISO/IEC JTC 1/SC 29/WG 11; Mar.-Apr. 2014; pp. 1-31.

Xiu, X., et al.; "Description of scree content coding technology proposal by InterDigital;" Joint Collaborative Team on Video Coding (JCT-VC) of ITU-T SG 16 WP 3 and ISO/IEC JTC 1/SC 29/WG 11; Mar.-Apr. 2014; pp. 1-30.

Zhu, W., et al.; "Palette-based compound image compression in HEVC by Exploiting Non-Local Spatial Correlation;" 2014 IEEE International Conference on Acoustic, Speech and Signal Processing (ICASSP); 2014; pp. 7348-7352.

Guo, L., et al.; "RCE3 Results of Test 3.1 on Palette Mode for Screen Content Coding;" Joint Collaborative Team on Video Coding (JCT-VC) of ITU-T SG 16 WP 3 and ISO/IEC JTC 1/SC 29/WG 11; Jul.-Aug. 2013; pp. 1-7.

Guo, L., et al.; "Evaluation of Palette Mode Coding on HM-12.0+RExt-4.1;" Joint Collaborative Team on Video Coding (JCT-VC) of ITU-T SG 16 WP 3 and ISO/IEC JTC 1/SC 29/WG 11; Oct.-Nov. 2013; pp. 1-7.

Joshi, R., et al.; "Screen Content Coding test model 2 (SCM 2);" Joint Collaborative Team on Video Coding (JCT-VC) of ITU-T SG 16 WP 3 and ISO/IEC JTC 1/SC 29/WG 11; Mar.-Apr. 2014; pp. 1-10.

* cited by examiner

| 0 | 0 | 0 | 1 | 4 | 4 | 0 | 0 | 0 | 0 | 0 | 0 |
|---|---|---|---|---|---|---|---|---|---|---|---|
| 0 | 0 | 0 | 1 | 4 | 4 | 0 | 0 | 2 | 4 | 4 | 4 |
| 0 | 0 | 0 | 1 | 4 | 4 | 0 | 0 | 2 | 4 | 4 | 0 |
| 0 | 0 | 0 | 1 | 4 | 4 | 0 | 0 | 2 | 4 | 4 | 0 |
| 0 | 0 | 0 | 1 | 4 | 4 | 0 | 0 | 2 | 4 | 4 | 0 |
| 0 | 0 | 0 | 1 | 4 | 4 | 0 | 0 | 2 | 4 | 4 | 0 |
| 0 | 0 | 0 | 1 | 4 | 4 | 0 | 0 | 2 | 4 | 4 | 0 |
| 0 | 0 | 0 | 1 | 4 | 4 | 0 | 0 | 2 | 4 | 4 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |

*Fig. 1A*

| 0 | 0 | 0 | 1 | 4 | 4 | 0 | 0 | 0 | 0 | 0 | 0 |
|---|---|---|---|---|---|---|---|---|---|---|---|
| 0 | 0 | 0 | 1 | 4 | 4 | 0 | 0 | 2 | 4 | 4 | 4 |
| 0 | 0 | 0 | 1 | 4 | 4 | 0 | 0 | 2 | 4 | 4 | 0 |
| 0 | 0 | 0 | 1 | 4 | 4 | 0 | 0 | 2 | 4 | 4 | 0 |
| 0 | 0 | 0 | 1 | 4 | 4 | 0 | 0 | 2 | 4 | 4 | 0 |
| 0 | 0 | 0 | 1 | 4 | 4 | 0 | 0 | 2 | 4 | 4 | 0 |
| 0 | 0 | 0 | 1 | 4 | 4 | 0 | 0 | 2 | 4 | 4 | 0 |
| 0 | 0 | 0 | 1 | 4 | 4 | 0 | 0 | 2 | 4 | 4 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |

*Fig. 1B*

|   |   |   |   |   |   |   |   |   |   |   |   |
|---|---|---|---|---|---|---|---|---|---|---|---|
| 0 | 0 | 0 | 1 | 4 | 4 | 0 | 0 | 0 | 0 | 0 | 0 |
| 0 | 0 | 0 | 1 | 4 | 4 | 0 | 0 | 2 | 4 | 4 | 4 |
| 0 | 0 | 0 | 1 | 4 | 4 | 0 | 0 | 2 | 4 | 4 | 0 |
| 0 | 0 | 0 | 1 | 4 | 4 | 0 | 0 | 2 | 4 | 4 | 0 |
| 0 | 0 | 0 | 1 | 4 | 4 | 0 | 0 | 2 | 4 | 4 | 0 |
| 0 | 0 | 0 | 1 | 4 | 4 | 0 | 0 | 2 | 4 | 4 | 0 |
| 0 | 0 | 0 | 1 | 4 | 4 | 0 | 0 | 2 | 4 | 4 | 0 |
| 0 | 0 | 0 | 1 | 4 | 4 | 0 | 0 | 2 | 4 | 4 | 0 |
| 0 | 0 | 0 | 1 | 4 | 4 | 0 | 0 | 2 | 4 | 4 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |

*Fig. 1C*

METHOD OF PULSE-CODE MODULATION AND PALETTE CODING FOR VIDEO CODING

CROSS REFERENCE TO RELATED APPLICATIONS

The present invention claims priority to U.S. Provisional Patent Application Ser. No. 62/060,810, filed on Oct. 7, 2014. The U.S. Provisional patent application is hereby incorporated by reference in its entirety.

FIELD OF THE INVENTION

The present invention relates to Pulse-Code Modulation (PCM) and palette coding for video data. In particular, the present invention discloses an efficient coding method to overcome the redundancy in palette signaling associated with the case having the palette size equal to zero or all pixels being escape pixels in a palette coded block (e.g. a coding unit, CU)

BACKGROUND AND RELATED ART

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition. Several coding tools for screen content coding have been developed. The palette coding tool related to the present invention is briefly reviewed as follow.

For palette coding, a palette is utilized to represent a given video block (e.g. CU) with limited number of values. The major components used for palette coding include:
1. Palette table. The palette table is used to map each palette color in the palette to a palette index.
2. Color index map. With the palette table defined, each pixel value in the current block is mapped to an index. The mapped indices for a block are referred as a color index map. The color index map may also be referred as an index map.
3. Palette predictor. In order to allow a decoder to reconstruct pixel values from palette indices, the palette table has to be signaled to the decoder. In order to reduce the data required for signaling the palette table, predictive coding is applied to the palette table. In particular, a previous palette table is used to predict the palette of the current block or shared by the current block.

The decoding and parsing process are briefly described as follows. Before the pixel values can be reconstructed from palette indices, the palette table has to be reconstructed. The signaling process for the palette table at the encoder side is described as follows.
1. Signaling 'palette sharing flag' first. The palette sharing flag indicates whether the current block shares the palette from a previous coded block. When the palette sharing flag is equal to 1, the current block shares the palette of a previous coded block. In other words, palette predictor is used as the current palette in this case. If the palette sharing flag is equal to 0, it indicates that the palette is not shared. The palette for the current block has to be signaled as described in step 2, where the current palette is coded predictively based on the previous palette.
2. The palette for the current block is predicted using the previous palette as a predictor. The coded information for the current palette is described as follows.
   a. Signaling 'reused flags'. The reused flags indicate whether the elements of the palette predictor are used in current palette, where a "1" indicated "reused" and a "0" indicates "not reused". The reused flags can identify these elements reused in the palette predictor.
   b. Signaling 'the number of non-predicted elements'. For the not predicted elements in the current palette, the elements have to be signaled. The number of non-predicted elements indicates the total number of elements in the current palette to be signaled.
   c. Signaling the value of each non-predicted element. After the number of non-predicted elements is signaled, the values of these non-predicted elements are signaled.

While the above procedure describes the signaling of the palette for the current palette, the decoder can reconstruct the palette accordingly.

After the palette is signaled, the color index map can be signaled as follows. First, the indices of the block (i.e., the color index map) are processed according to a horizontal raster scan order, vertical raster order, horizontal traverse scan order or vertical traverse order. The indices in the scan order are then run-length coded, where for each position of the indices in the scan order, a flag is first transmitted to indicate the prediction mode as 'copy above mode' or 'copy index mode'.
1. 'copy above mode'. This run mode indicates that the indices starting from the current position in the scan order are the same as these indices above for consecution N indices (including the index in the current position). N is referred as 'number of runs'. The 'copy above mode' is first signaled using a mode flag and is followed by the 'number of runs'.
2. 'copy index mode' (also referred as "new run mode"). This run mode indicates that the indices starting from the current position in the scan order are the same as the leading non-ESCAPE index for consecution N indices (including the index in the current position). The 'copy index mode' is first signaled using a mode flag and is followed by the index and then the 'number of runs'. If the index is ESCAPE, the 'copy index mode' is first signaled using a mode flag and is followed by the index and then the pixel value.

FIGS. 1A-C illustrate an exemplary of palette index map and palette index map coding according to screen content coding test model 2.0 (SCM-2.0). FIG. 1A illustrates a palette index map with palette indices 0 through 3 for palette colors and palette index 4 for Escape samples. The index corresponding to Escape samples is also referred as an Escape index in this disclosure. FIG. 1B illustrates palate index map coding according to SCM-2.0, where "copy-index mode" is applied to four groups (110, 120, 130 and 140) of the indices in the first row with "palette runs" corresponding to 3, 1, 2, and 6. FIG. 1C illustrates an example of palette index map coding for the second row, wherein "copy-above mode" is applied to the first group of samples (150) and "copy-index mode" is applied to the next two groups (160 and 170) with runs corresponding to 8, 1 and 3.

According to the existing palette coding, each escape pixel is signaled using "copy index mode", where the mode flag, index and pixel value are transmitted. When palette size is equal to zero and all pixels are escape pixels in a palette coded block (e.g. CU), the values are signaled individually using the mode flag, index and pixel value. In the case, the process is roughly the same as using PCM (Pulse-Code Modulation) mode as in AVC and HEVC, which may introduce duplication and thus is not efficient from coding perspective. Therefore, it is desirable to develop coding method to remove the redundancy and improve the coding efficiency when palette mode is enabled. Furthermore, it is desirable to develop efficient coding for the case that all samples in a block are escape samples.

BRIEF SUMMARY OF THE INVENTION

Methods of improving coding efficiency for coding a block of video data using palette coding in a video coding are disclosed. According to one embodiment of the present invention, the palette transpose flag is signaled conditionally depending on the maximum index value or the palette size. If the maximum index value or the palette size is equal to or greater than a threshold size, the palette transpose flag is signaled at an encoder side or the palette transpose flag is parsed at a decoder side. Otherwise, the palette transpose flag is not signaled in the encoder or is not parsed in the decoder.

The maximum index value or the palette size can be derived based on one or more other syntax element, or signaled explicitly in a syntax table. For example, the palette transpose flag can be signaled in a location of a syntax table after the maximum index value or the palette size. When the palette size is derived, the palette size can be determined based on the syntax element indicating the number of palette entries predicted by a previously used palette and the syntax element indicating the number of signaled palette entries. When the palette size is derived, the palette size is determined after syntax signaling for a palette sharing flag, the number of palette entries predicted by a previously used palette and the number of signaled palette entries.

If the palette transpose flag is not available, the palette transpose flag can be inferred as zero corresponding to no palette transpose. The threshold size can be equal to zero, one or two. If the palette size is equal to zero, a last palette and a last palette size are not updated by the current palette with a current palette size.

In another embodiment, the last palette and the last palette size are updated by the current palette with the current palette size conditionally. For example, updating the last palette and the last palette size by the current palette with the current palette size is skipped if the current coding unit is coded using a pulse-coded modulation (PCM) mode or a current palette size is zero.

In yet another embodiment, if the palette size is equal to zero, the current coding unit is coded using a pulse-coded modulation (PCM) mode. In this case, any syntax element associated with the pulse-coded modulation (PCM) mode corresponding to an Intra coded coding unit is omitted.

In still yet another embodiment, signaling or parsing a palette sharing flag is according to the palette size. For example, the sharing flag is signaled or parsed if the current palette size is equal to or greater than a previous palette size.

If the palette sharing flag is not available, the palette sharing flag is inferred as zero corresponding to no palette sharing.

In still yet another embodiment, the palette transpose flag is signaled at an encoder side or parsed at a decoder side only if the palette sharing flag indicates no palette sharing. If the palette sharing flag is not available, the palette sharing flag can be inferred as zero corresponding to no palette sharing.

BRIEF DESCRIPTION OF THE DRAWINGS

FIGS. 1A-C illustrate an exemplary of palette index map and palette index map coding according to screen content coding test model 2.0 (SCM-2.0).

DETAILED DESCRIPTION OF THE INVENTION

Figure 2:
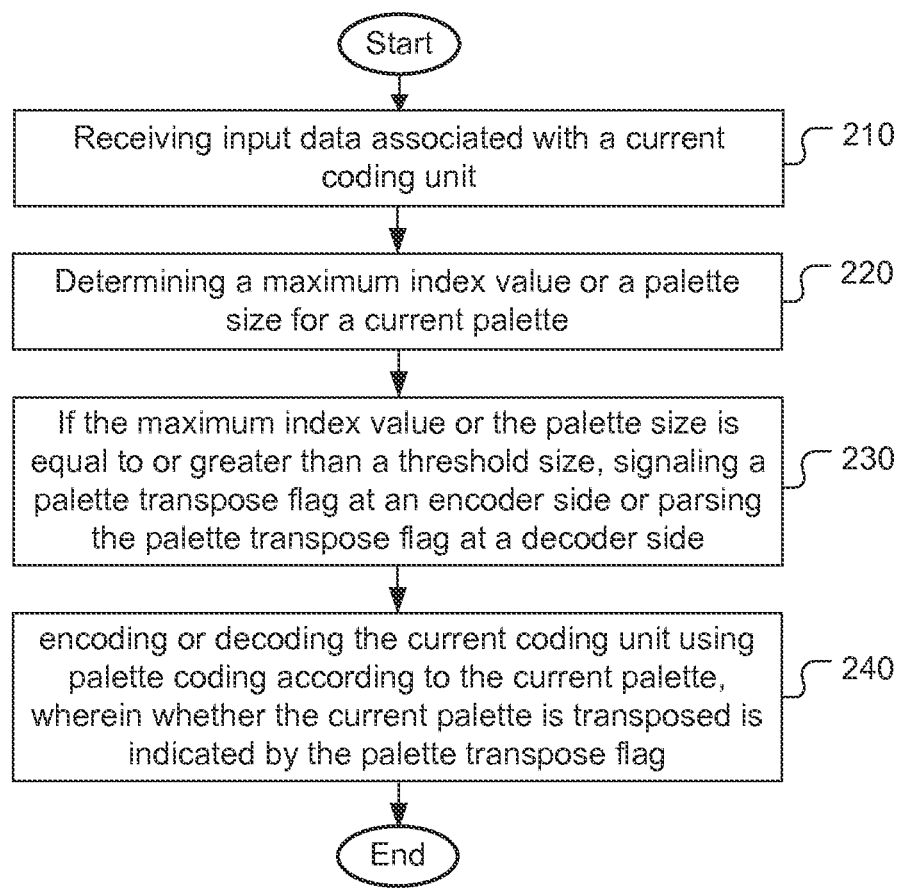
FIG. 2 illustrates an exemplary flowchart for a coding system with improved coding efficiency for palette coding according to an embodiment of the present invention, where the palette transpose flag is signaled conditionally depending on e maximum index value or the palette size.

The following description is of the best-contemplated mode of carrying out the invention. This description is made for the purpose of illustrating the general principles of the invention and should not be taken in a limiting sense. The scope of the invention is best determined by reference to the appended claims.

According to one embodiment of the present invention, the palette size for the current coding block is explicitly signaled. Therefore, a syntax element "palette_size" is signaled at the beginning of palette coding process. The PCM mode is invoked when palette coding is used and the palette size is equal to zero. Table 1 illustrates an exemplary palette_coding( ) syntax design incorporating an embodiment of the present invention. As indicated by note (1.a), the syntax element for palette_size is located at the beginning of the palette_coding( ) syntax. The palette size is checked to determine whether it is zero as indicated in note (1.b). If the palette size is zero, syntax lines from note (1.c) through note (1.e) are included to signal PCM information for the current block.

TABLE 1

|  | Note |
|---|---|
| palette_coding( x0, y0, nCbS ) { | |
|     palette_size | (1.a) |
|     if( palette_size == 0 ) { /* PCM */ | (1.b) |
|         while( !byte_aligned( ) ) | (1.c) |
|             pcm_alignment_zero_bit | (1.d) |
|         pcm_sample( x0, y0, log2CbSize ) | (1.e) |
|     } | |
|     ... | |
| } | |

Table 2 illustrates the coding_unit( ) syntax table according to the existing standard, where the relevant syntax lines are listed and labelled as notes (2.a) through (2.k). These syntax lines are related PCM mode for an Intra CU. Since the palette coding for escape samples is equivalent to PCM mode, there is no need for another PCM mode. Therefore, according to one embodiment of the present invention, the syntax lines associated with PCM mode as indicated by notes (2.a) through (2.k) for an Intra CU can be removed.

TABLE 2

| | Note |
|---|---|
| coding_unit( x0, y0, log2CbSize ) { | |
| ... | |
|   if( CuPredMode[ x0 ][ y0 ] = = MODE_INTRA && !intra_bc_flag[x0][y0] ) { | (2.a) |
|     if( PartMode = = PART_2Nx2N && pcm_enabled_flag && | (2.b) |
|       log2CbSize >= Log2MinIpcmCbSizeY && | |
|       log2CbSize <= Log2MaxIpcmCbSizeY ) | |
|     pcm_flag[ x0 ][ y0 ] | (2.c) |
|     if( pcm_flag[ x0 ][ y0 ] ) { | (2.d) |
|       while( !byte_aligned( ) ) | (2.e) |
|         pcm_alignment_zero_bit | (2.f) |
|       pcm_sample( x0, y0, log2CbSize ) | (2.g) |
|     } else { | (2.h) |
|     ... | |
|     } | (2.i) |
|   if( !pcm_flag[ x0 ][ y0 ] ) { | (2.j) |
|   ... | |
|   } | (2.k) |
| ... | |

In one embodiment, the signaling of syntax flag "palette_transpose_flag" for specifying whether the palette is transposed may be eliminated when palette size is less than a positive integer, palette_transpose_min_size. For example, this positive integer may be equal to 1 or 2. When not signaled, "palette_transpose_flag" is inferred to be 0 (i.e. OFF). In other words, the palette will not be transposed in this case. Table 3 illustrates an exemplary syntax design for palette_coding( ) incorporating an embodiment of the present invention. When palette size is greater than a minimum size for incorporating palette transpose (i.e., palette_transpose_min_size) as indicated in note (3.a), the syntax element, palette_transpose_flag is incorporated as indicated by note (3.b).

TABLE 3

| | Note |
|---|---|
| palette_coding( x0, y0, nCbS ) { | |
| ... | |
|   if (palette_size > palette_transpose_min_size) | (3.a) |
|     palette_transpose_flag | (3.b) |
| ... | |
| } | |

In another embodiment, the signaling of syntax flag "palette_share_flag" for specifying whether the palette of current coding block is shared from the previously used palette may be eliminated if the current palette size is smaller than the previous palette size. When the syntax flag is not signaled, "palette_share_flag" is inferred to be 0 (i.e. OFF). Table 4 illustrates an exemplary syntax design for palette_coding( ) incorporating an embodiment of the present invention. When palette size is equal to or greater than a previous palette size for allowing palette sharing (i.e., previousPaletteSize) as indicated in note (4.a), the syntax element, palette_share_flag is incorporated as indicated by note (4.b).

TABLE 4

| | Note |
|---|---|
| palette_coding( x0, y0, nCbS ) { | |
| ... | |

TABLE 4-continued

| | Note |
|---|---|
|   if( palette_size >= previousPaletteSize ) | (4.a) |
|     palette_share_flag[ x0 ][ y0 ] | (4.b) |
| ... | |
| } | |

In yet another embodiment, the number of signaled palette entries for the current palette coded block is not signaled and instead, the number of signaled palette entries for the current palette coded block is derived as follows:

num_signalled_palette_entries=palette_size−numPredPreviousPalette, where numPredPreviousPalette corresponds to the number of palette element predicted by the previous palette.

In another embodiment, the palette_transpose_flag is signaled after signalling palette_share_flag. Furthermore, the palette_transpose_flag is signaled only when palette_share_flag is 0 (i.e., palette share is OFF). Furthermore, when the palette of current palette coded coding block shares with the previous palette, the scan mode or direction will not be signaled since it inherits from the previous scan mode or direction.

When the PCM is invoked or palette_size is equal to 0, the update of last coded palette table and last coded palette size can be skipped since the palette table update becomes meaningless. Table 5 illustrates an exemplary palette_coding( ) syntax design incorporating an embodiment of the present invention. The palette table updating process as shown between note (5.b) and note (5.c) is performed only if the palette size is greater than 0 (i.e., palette_size>0) as indicated by note (5.a).

TABLE 5

| | Note |
|---|---|
| palette_coding( x0, y0, nCbS ) { | |
| ... | |
|   if (palette_size > 0) { | (5.a) |
|     previousPaletteSize = palette_size | (5.b) |
|     current_size = palette_size | |
|     for( i = 0; i < palette_size; i++ ) | |
|       ... | |
|       if( previous_palette_entry_flag[ i ] = = 0 ) { | |
|         ... | |
|         tempPaletteEntries[ cIdx ][ current_size ] = previousPaletteEntries[cIdx][i] | |
|         current_size++ | |
|       } | |
|     previousPaletteStuffingSize = current_size | |
|     previousPaletteEntries = tempPaletteEntries | (5.c) |
|   } | |
| } | |

In another embodiment of the present invention, the palette_size is not explicitly signaled. Instead, the palette_size is derived after the syntax signaling of palette_share_flag, previous_palette_entry_flag, and num_signalled_palette_entries, as shown in Table 6. As shown in Table 6, if the palette share flag (i.e., palette_share_flag) indicates the palette is shared from a previous palette as indicated by note (6.a), the palette size is derived as the previous palette size (palette_size=previousPaletteSize) as indicated by note (6.b). If the palette is not shared, the palette size is derived as palette_size=numPredPreviousPalette+num_signalled_palette_entries as indicated by note (6.e). The location of this derived palette_size is after previous_palette_entry_flag as indicated by note (6.c) and num_signalled_palette_entries as indicated by note (6.d). When the palette_size is equal to 0, the PCM mode is invoked. The signaling of palette_escape_val_present_flag can be skipped if the PCM mode is invoked. Table 7 illustrates an exemplary palette coding syntax table incorporating an embodiment of the present invention. Syntax lines from note (7.a) through note (7.b) of Table 7 correspond to PCM signaling for the current block. Furthermore, palette_escape_val_present_flag is signaled only when the palette size is greater than 0 as indicated by note (7.c). The PCM mode associated with the Intra mode and its signaling can be omitted, as shown in Table 2.

TABLE 6

|  | Note |
|---|---|
| palette_coding( x0, y0, nCbS ) { | |
| ... | |
| palette_share_flag[ x0 ][ y0 ] | |
| if( palette_share_flag[ x0 ][ y0 ] ) { | (6.a) |
| palette_size = previousPaletteSize | (6.b) |
| ... | |
| } else { | |
| ... | |
| for( i = 0; i < previousPaletteStuffingSize && | |
| !palette_last_group && | |
| numPredPreviousPalette < max_palette_size; | |
| i++ ) { | |
| ... | |
| if( palette_all_zeros_in_group ) | |
| i += 4 | |
| else { | |
| ... | |
| for( idx = i; idx <= lastIdx && | |
| numPredPreviousPalette < max_palette_size; | |
| idx++ ) { | |
| if ( idx = = lastIdx && | |
| numOnesInGroup = = 0 ) | |
| previous_palette_entry_flag[ idx ] = 1 | |
| else | |
| previous_palette_entry_flag[ idx ] | (6.c) |
| if ( previous_palette_entry_flag[ idx ] ) | |
| { | |
| ... | |
| } | |
| } | |
| ... | |
| } | |
| } | |
| if( numPredPreviousPalette < max_palette_size) | |
| num_signalled_palette_entries | (6.d) |
| for( cIdx = 0; cIdx < 3; cIdx++ ) | |
| for( i = 0; i < num_signalled_palette_entries; i++ ) | |
| palette_entries[ cIdx ][ numPredPreviousPalette + i ] | |
| palette_size = numPredPreviousPalette + num_signalled_palette_entries | (6.e) |
| } | |
| ... | |
| } | |

TABLE 7

|  | Note |
|---|---|
| palette_coding( x0, y0, nCbS ) { | |
| ... | |
| if( palette_size == 0 ) { /* PCM */ | (7.a) |
| while( !byte_aligned( ) ) | |
| pcm_alignment_zero_bit | |
| pcm_sample( x0, y0, log2CbSize) | |
| } | (7.b) |

TABLE 7-continued

|  | Note |
|---|---|
| else { /* if( palette_size > 0 ) */ | |
| palette_escape_val_present_flag | (7.c) |
| ... | |
| } | |

The signaling of syntax flag "palette_transpose_flag may also be transmitted only when palette_size or indexMax is equal to or larger than a positive integer, palette_transpose_min_size. For example, the positive integer can be 1, 2 or 0. When palette_transpose_flag is not signaled, "palette_transpose_flag" is inferred to be 0 (i.e. OFF), which implies that the palette will not be transposed. Table 8 illustrates an exemplary palette coding syntax table incorporating an embodiment of the present invention. The syntax element, indexMax corresponds to the maximum palette index for the current block and the indexMax is related to the palette size. If the current block has any escape sample as indicated by note (8.a), indexMax is equal to palette size as indicated by note (8.b). If the current block has no escape sample, indexMax is equal to (palette size−1) as indicated by note (8.c). When palette_size or indexMax is equal to or larger than a positive integer as indicated by note (8.d), palette_transpose_flag is signaled as indicated by note (8.e). When the PCM is invoked or palette_size is equal to 0, the update of last coded palette table and last coded palette size can be skipped for not to update the meaningless data, as shown in Table 5.

TABLE 8

|  | Note |
|---|---|
| palette_coding( x0, y0, nCbS ) { | |
| ... | |
| palette_escape_val_present_flag | |
| if( palette_escape_val_present_flag ) | (8.a) |
| indexMax = palette_size | (8.b) |
| else | |
| indexMax = palette_size − 1 | (8.c) |
| if (palette_size >= palette_transpose_min_size) or if (indexMax >= palette_transpose_min_size) | (8.d) |
| palette_transpose_flag | (8.e) |
| ... | |
| } | |

The signaling of syntax flag "palette_transpose_flag" may be conditionally transmitted depending on whether palette_size or indexMax is equal to or larger than a positive integer, palette_transpose_min_size. The location of syntax flag "palette_transpose_flag" is moved after the location where the palette_size is determined. The positive integer may be equal to 1, 2 or 0. When the syntax flag "palette_transpose_flag" is not signaled, "palette_transpose_flag" is inferred to be 0 (i.e. OFF). In other words, the palette will not be transposed.

When the palette_size is equal to 0, the update of last coded palette table and last coded palette size can be skipped for not to update the meaningless data, as shown in Table 5.

FIG. 2 illustrates an exemplary flowchart for a coding system with improved coding efficiency for palette coding according to an embodiment of the present invention, where the palette transpose flag is signaled conditionally depending one maximum index value or the palette size. The system receives input data associated with a current coding unit in step 210. For encoding, the input data associated with the current coding unit corresponds to video samples of the current coding unit to be coded. For decoding, the input data associated with the current coding unit corresponds to the coded data associated with the current coding unit. The input data associated with the current coding unit may be retrieved from memory (e.g., computer memory, buffer (RAM or DRAM) or other media) or from a processor. A maximum index value or a palette size for a current palette is determined in step 220. If the maximum index value or the palette size is equal to or greater than a threshold size, a palette transpose flag is signaled at an encoder side or parsed at a decoder side in step 230. The current coding unit is then encoded or decoded using palette coding according to a current palette in step 240, where whether the current palette is transposed is indicated by the palette transpose flag.

Figure 3:
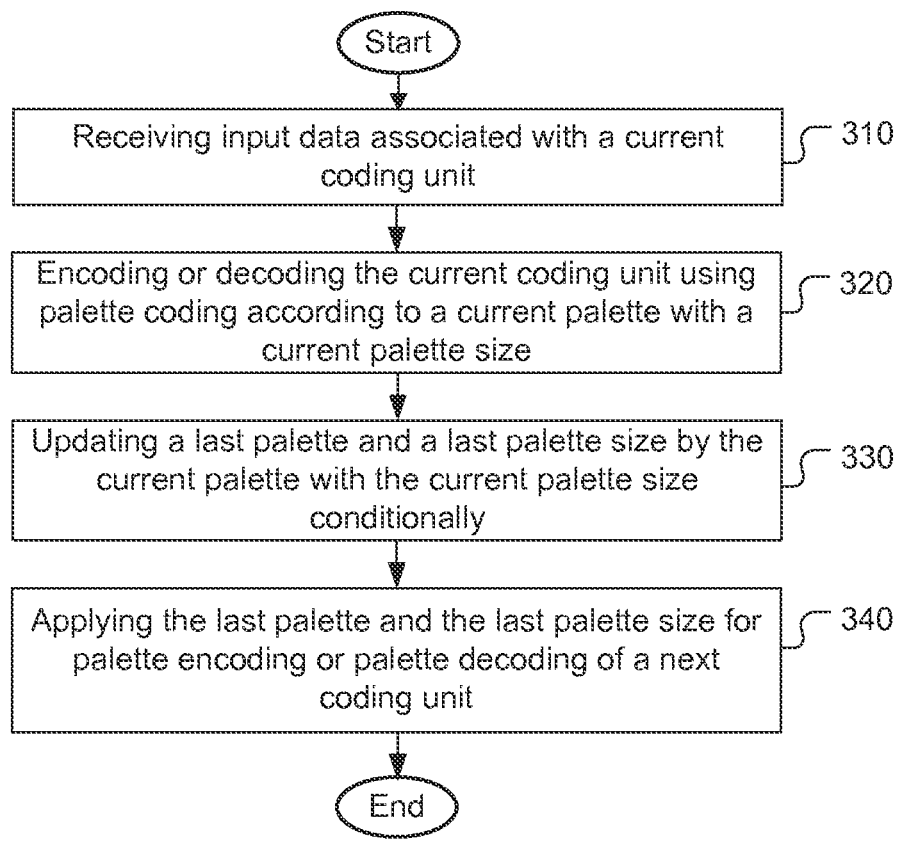
FIG. 3 illustrates an exemplary flowchart for a coding system with improved coding efficiency for palette coding according to an embodiment of the present invention, where the last palette and the last palette size are updated by the current palette with the current palette size conditionally.

FIG. 3 illustrates an exemplary flowchart for a coding system with improved coding efficiency for palette coding according to an embodiment of the present invention, where the last palette and the last palette size are updated by the current palette with the current palette size conditionally. The system receives input data associated with a current coding unit in step 310. For encoding, the input data associated with the current coding unit corresponds to video samples of the current coding unit to be coded. For decoding, the input data associated with the current coding unit corresponds to the coded data associated with the current coding unit. The input data associated with the current coding unit may be retrieved from memory (e.g., computer memory, buffer (RAM or DRAM) or other media) or from a processor. The current coding unit is then encoded or decoded using palette coding according to a current palette with a current palette size in step 320. The last palette and the last palette size are updated by the current palette with the current palette size conditionally in step 330. The last palette and the last palette size are applied for palette encoding or palette decoding of a next coding unit in step 340.

The flowcharts shown above are intended for serving as examples to illustrate embodiments of the present invention. A person skilled in the art may practice the present invention by modifying individual steps, splitting or combining steps with departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of coding a block of video data using palette coding for a video coding system, the method comprising:

receiving input data associated with a current coding unit;

determining a maximum index value or a palette size for a current palette;

if the maximum index value or the palette size is equal to or greater than a threshold size, signaling a palette transpose flag at an encoder side or parsing the palette transpose flag at a decoder side; and encoding or decoding the current coding unit using palette coding according to the current palette, wherein whether the current palette is transposed is indicated by the palette transpose flag.

2. The method of claim 1, wherein the maximum index value or the palette size is derived based on one or more other syntax element, or signaled explicitly in a syntax table.

3. The method of claim 2, wherein the palette transpose flag is signaled in a location of a syntax table after the maximum index value or the palette size.

4. The method of claim 2, wherein when the palette size is derived, the palette size is determined based on a first syntax element corresponding to a first number of palette entries predicted by a previously used palette and a second syntax element corresponding to a second number of signaled palette entries.

5. The method of claim 2, wherein when the palette size is derived, the palette size is determined after syntax signaling for a palette sharing flag, a first number of palette entries predicted by a previously used palette and a second number of signaled palette entries.

6. The method of claim 1, wherein if the palette transpose flag is not available, the palette transpose flag is inferred as zero corresponding to no palette transpose.

7. The method of claim 1, wherein the threshold size equals to zero, one or two.

8. The method of claim 1, wherein if the palette size is equal to zero, a last palette and a last palette size are not updated by the current palette with a current palette size.

9. A method of coding a block of video data using palette coding for a video coding system, the method comprising:
 receiving input data associated with a current coding unit;
 encoding or decoding the current coding unit using palette coding according to a current palette with a current palette size;
 updating a last palette and a last palette size by the current palette with the current palette size conditionally; and
 applying the last palette and the last palette size for palette encoding or palette decoding of a next coding unit.

10. The method of claim 9, wherein said updating the last palette and the last palette size by the current palette with the current palette size is skipped if the current coding unit is coded using a pulse-coded modulation (PCM) mode or a current palette size is zero.

11. A method of coding a block of video data using palette coding for a video coding system, the method comprising:
 receiving input data associated with a current coding unit;
 determining a palette size for a current palette; and
 if the palette size is equal to zero, encoding or decoding the current coding unit using a pulse-coded modulation (PCM) mode.

12. The method of claim 11, wherein any syntax element associated with the pulse-coded modulation (PCM) mode corresponding to an Intra coded coding unit is omitted.

13. A method of coding a block of video data using palette coding for a video coding system, the method comprising:
 receiving input data associated with a current coding unit;
 determining a palette size for a current palette;
 signaling or parsing a palette sharing flag is according to the palette size, wherein the palette sharing flag indicates whether to share a previously used palette for the current coding unit;
 if the palette sharing flag indicates palette sharing, using the previously used palette as a current palette and if the palette sharing flag indicates no palette sharing, deriving the current palette with at least one entry different from the previously used palette; and
 encoding or decoding the current coding unit using palette coding according to the current palette.

14. The method of claim 13, wherein the palette sharing flag is signaled or parsed if a current palette size is equal to or greater than a previous palette size.

15. The method of claim 13, wherein if the palette sharing flag is not available, the palette sharing flag is inferred as zero corresponding to no palette sharing.

16. A method of coding a block of video data using palette coding for a video coding system, the method comprising:
 receiving input data associated with a current coding unit;
 determining a palette sharing flag, wherein the palette sharing flag indicates whether to share a previously used palette for the current coding unit;
 if the palette sharing flag indicates no palette sharing, signaling a palette transpose flag at an encoder side or parsing the palette transpose flag at a decoder side; and
 encoding or decoding the current coding unit using palette coding according to a current palette, wherein whether the current palette is transposed is indicated by the palette transpose flag.

17. The method of claim 16, wherein if the palette sharing flag is not available, the palette sharing flag is inferred as zero corresponding to no palette sharing.

\* \* \* \* \*